(12) United States Patent
Hashimura et al.

(10) Patent No.: US 10,744,552 B2
(45) Date of Patent: Aug. 18, 2020

(54) JOINING METHOD FOR MEMBERS

(71) Applicant: Kobe Steel, Ltd., Hyogo (JP)

(72) Inventors: Toru Hashimura, Kobe (JP); Kenichi Watanabe, Kobe (JP); Junya Naitou, Kobe (JP); Yasuhiro Maeda, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/080,515

(22) PCT Filed: Feb. 21, 2017

(86) PCT No.: PCT/JP2017/006315
§ 371 (c)(1),
(2) Date: Aug. 28, 2018

(87) PCT Pub. No.: WO2017/169299
PCT Pub. Date: Oct. 5, 2017

(65) Prior Publication Data
US 2019/0060975 A1 Feb. 28, 2019

(30) Foreign Application Priority Data
Mar. 31, 2016 (JP) .................................. 2016-072324

(51) Int. Cl.
*B21D 39/20* (2006.01)
*B21D 39/06* (2006.01)
(Continued)

(52) U.S. Cl.
CPC .......... *B21D 39/206* (2013.01); *B21D 39/06* (2013.01); *B21D 41/028* (2013.01); *F16B 4/004* (2013.01); *F16B 17/006* (2013.01)

(58) Field of Classification Search
CPC .... B21D 39/206; B21D 39/06; B21D 41/028; F16B 4/004; F16B 17/006
See application file for complete search history.

(56) References Cited

U.S. PATENT DOCUMENTS

| 5,984,562 A | 11/1999 | Brandenstein et al. |
| 2006/0284432 A1* | 12/2006 | Hashimoto ............ B21D 39/06 293/154 |

(Continued)

FOREIGN PATENT DOCUMENTS

| JP | H04-017928 A | 1/1992 |
| JP | H06-341355 A | 12/1994 |

(Continued)

OTHER PUBLICATIONS

JP 2010051975; Kokubo et al.; Pipe and to be Joined Member Bracket; EPO English Machine Translation; Nov. 12, 2019; pp. 1-12.*

(Continued)

*Primary Examiner* — Bayan Salone
(74) *Attorney, Agent, or Firm* — Studebaker & Brackett PC

(57) ABSTRACT

The joining method for members according to the present invention includes: providing an aluminum component including an insertion hole provided with a rib in at least part of an edge part, and a hollow steel pipe; inserting the steel pipe into the insertion hole of the aluminum component; and expanding and deforming the steel pipe to join the steel pipe to the aluminum component by press-fitting.

22 Claims, 14 Drawing Sheets

(51) Int. Cl.
  *B21D 41/02* (2006.01)
  *F16B 4/00* (2006.01)
  *F16B 17/00* (2006.01)

(56) References Cited

U.S. PATENT DOCUMENTS

2010/0102582 A1* 4/2010 Hashimoto ............ B21D 39/06
  293/154
2010/0289300 A1* 11/2010 Kokubo ................. B21D 39/04
  296/205

FOREIGN PATENT DOCUMENTS

| JP | H07-080571 A | 3/1995 |
| JP | H10-096412 A | 4/1998 |
| JP | 2007-222877 A | 9/2007 |
| JP | 2007-284039 A | 11/2007 |
| JP | 2010-046697 A | 3/2010 |
| JP | 2010-051975 A | 3/2010 |
| JP | 2010051975 A * | 3/2010 |

OTHER PUBLICATIONS

Notification of Transmittal of Translation of the International Preliminary Report on Patentability and Translation of Written Opinion of the International Searching Authority; PCT/JP2017/006315; dated Oct. 2, 2018.
International Search Report issued in PCT/JP2017/006315; dated Apr. 4, 2017.

* cited by examiner

JOINING METHOD FOR MEMBERS

CROSS-REFERENCE TO RELATED APPLICATIONS

This is a national phase application in the United States of International Patent Application No. PCT/JP2017/006315 with an international filing date of Feb. 21, 2017, which claims priority of Japanese Patent Application No. 2016-072324 filed on Mar. 31, 2016, the contents of which are incorporated herein by reference.

TECHNICAL FIELD

The present invention relates to a joining method for members.

BACKGROUND ART

A thin steel plate with high strength, which is called as high-tension steel, has been increasingly used for a structural member of an automobile. Such a high-tension steel is effective for weight reduction and safety improvement, but is heavier than a low specific gravity material such as aluminum. The high-tension steel has problems such as decrease of forming easiness, increase of a forming load, and decrease of dimensional accuracy due to its high strength. In order to solve these problems, in recent years, multiple-material approach has been adopted, in which extrusion molded products, cast products, or press molded products made of aluminum with a smaller specific gravity than that of steel plates is utilized together with steel parts.

In the multiple-material approach, joining of steel parts and aluminum parts involves a problem. In the welding technique typified by spot welding, a brittle intermetallic compound (IMC) is generated at the interface between a steel plate and an aluminum plate, so that practically applied joining techniques include electromagnetic forming bonding, screw fastening typified by bolts and nuts, friction stir welding (FSW), rivets, self-piercing rivets (SPR), mechanical clinching, and adhesion.

In press-fitting by electromagnetic forming, a solenoid formed coil is inserted into a pipe component fitted to a mating component, and followed by applying impact current to the coil so that induced current is induced in the conductive pipe by change in a magnetic field generated by applying impact current. Electromagnetic force is generated between magnetic field generated by the primary current of the coil and induced current flowing in the opposite direction along the circumferential direction of the pipe. This causes that the pipe receives outward moving force, and thus is enlarged and deformed to join the pipe to the mating component by press-fitting. This joining method is suitable for copper and aluminum, which are highly electrically conductive, and is practically used in parts of joining of automobile components.

JP 2007-284039 A discloses a press-fit joining technology by electromagnetic forming for multiple-material approach. In the technology of JP 2007-284039 A, a bumper reinforcement made of a metal material and having a hollow section is expanded and deformed by electromagnetic forming, and accordingly, fitted and joined to a hole provided to a bumper stay made of aluminum alloy.

SUMMARY OF THE INVENTION

Problems to be Solved by the Invention

In the electromagnetic molding according to JP 2007-284039 A, a first member and a second member are joined together effectively in line contact or edge contact, and thus have a small joining area, which may cause insufficient joining strength. Furthermore, the second member has a small curvature at a joining part, and thus potentially cracks. To solve these problems, the joining part can be subject to such fabrication as burring to increase the joining area, thereby improving the joining strength. However, the burring fabrication may be difficult, depending on the shape of the joining part. Even when the joining part has a shape that allows the burring fabrication, man-hours are increased by the fabrication, which leads to increase of manufacturing cost.

The present invention is intended to provide a joining method for members that achieves increased joining strength and prevents cracking of the members.

Means for Solving the Problems

A joining method for members according to the present invention includes providing a first member as well as a second member having a follow shape, the first member including a first wall part in which an insertion hole is formed, and a rib provided in at least part of an edge part of the insertion hole; inserting the second member into the insertion hole of the first member; and expanding and deforming the second member to join the second member to the first member by press-fitting.

Since the rib is provided at the edge part of the insertion hole, the first member (first wall part) and the second member are joined together effectively in planar contact, and thus have an increased contact area at a joining part therebetween, thereby achieving increased joining strength. In addition, the second member can have increased curvature at the joining part, which prevents cracking of the second member. The present method can increase the joining strength without subjecting the molded first member to post fabrication such as burring and prevent cracking of the second member, thereby reducing increase in man-hour and manufacturing cost.

The first member may be an extruded hollow rectangular pipe before extrusion, and the rib may extend in a longitudinal direction of the first member.

Since the first member is an extruded hollow rectangular pipe, the rib can be provided simultaneously with molding of the first member, thereby reducing man-hour increase due to molding of the rib. However, since the extrusion molding is employed, a direction in which the rib extends is limited to the extrusion direction (longitudinal direction). In addition, in the present method, the method of expanding and deforming the second member is not limited to electromagnetic molding, and thus the shape of the first member is not particularly limited, but the press-fit joining is also applicable to the first member having the shape of a rectangular pipe.

The rib of the first member may be provided only at the edge part of the insertion hole.

When the first member is an extruded hollow rectangular pipe, the rib is basically provided along the total length in the extrusion direction. However, the rib in contact with the second member at the edge part of the insertion hole is effective for increasing the joining strength, and thus the rib at the other part is cut off to reduce the weight of the first member.

The first member may be made of aluminum die-cast material, and the rib may be provided at an entire circumference of the edge part.

Since the first member is made of die-cast material, the rib can be provided at the entire circumference of the edge part of the first member at molding. Thus, an increased joining area can be obtained as compared to a case of an extruded member provided with a rib extending only in the extrusion direction, thereby achieving further increased joining strength.

The rib may protrude from both surfaces of the first wall part.

Since the rib protrudes from both surfaces of the first wall part, increased joining strength can be obtained as compared to a case in which the rib protrudes only from one of the surfaces. Specifically, when having the same height, the rib is more likely to bend at joining in a configuration in which the rib protrudes from one of the surfaces. When the rib bends, the height of the rib decreases, the joining area decreases, and accordingly, the joining strength decreases. Thus, the rib preferably protrudes from both surfaces of the first wall part.

The method may include bending outward at least part of an end part of the second member.

Since the end part of the second member is bent outward, the bent end part functions as a removal prevention member to prevent the second member from coming off the first member when the press-fit joining is broken.

For example, the first member includes a second wall part facing the first wall part, the second wall part protrudes toward the first wall part, and at least part of the end part of the second member is bent outward by pressing the end part of the second member against the second wall part.

The method may include disposing an insulation member between the first member and the second member.

Since the insulation member is disposed between the first and second members, electric corrosion can be prevented from occurring between the first and second members. In particular, since the present method provides the rib at the joining part to have an increased contact area, the contact between the first and second members is made in planar contact, not in edge contact. Thus, the configuration with the planar contact allows the insulation member to be easily disposed as compared to a configuration with side contact, thereby more easily preventing electric corrosion between dissimilar metals.

According to the present invention, the contact area of a joining part between a first member and a second member can be increased by providing a rib at an edge part of an insertion hole. Thus, increased joining strength can be achieved, and the second member can have increased curvature at the joining part, which prevents cracking of the second member.

MODE FOR CARRYING OUT THE INVENTION

Embodiments of the present invention will be described below with the accompanying drawings.

Materials of individual members are exemplarily described below in embodiments, but are not particularly limited to those exemplarily described in the embodiments. The present invention is applicable to any optional material.

First Embodiment

Figure 1:
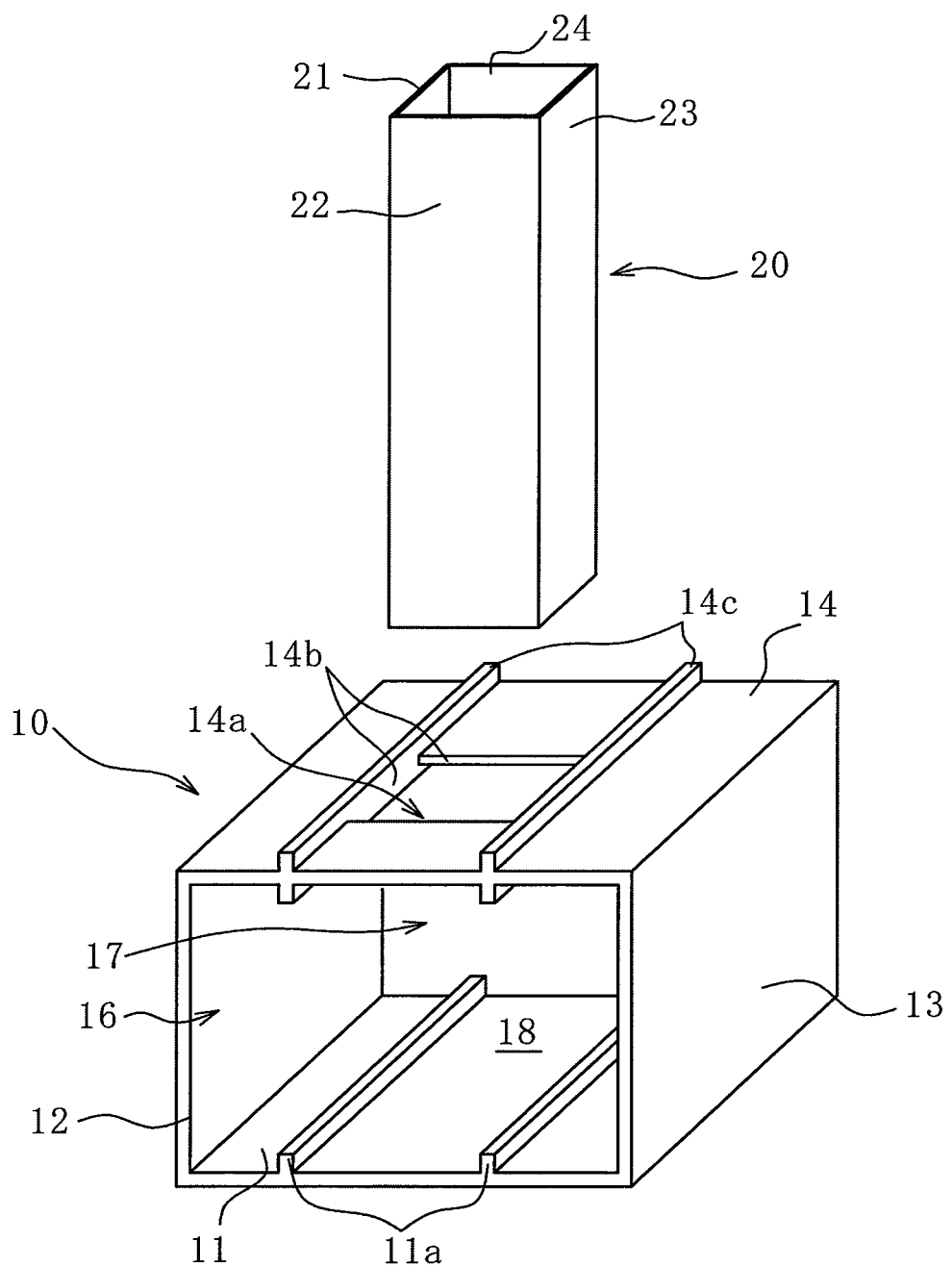
FIG. 1 is a perspective view of a first member and a second member according to a first embodiment of the present invention before press-fit joining.

As illustrated in FIG. 1, a press-fit joining method according to the present embodiment joins an aluminum component (first member) 10 and a steel pipe (second member) 20. In the press-fit joining method, first, the aluminum component (first member) 10 and the steel pipe (second member) 20 are prepared.

The aluminum component 10 is an extruded member made of aluminum alloy, and a hollow rectangular pipe extending in the front-back direction in FIG. 1. The aluminum component 10 includes a horizontal bottom wall (second wall part) 11, two sidewalls 12 and 13 vertically extending upward from the bottom wall 11, and a horizontal top wall (first wall part) 14 connecting upper end parts of the two sidewalls 12 and 13. A rectangular insertion hole 14a is formed in the top wall 14 includes. A rib 14c is provided at part of an edge part 14b of the insertion hole 14a. Similarly, a rib 11a is provided on the bottom wall 11 at a position overlapping with the rib 14c in plan view. The ribs 11a and 14a extend along the total length of the aluminum component 10 in the extrusion direction (longitudinal direction) of the aluminum component 10, which is the front-back direction in FIG. 1, on the right and left sides of the edge part 14b in FIG. 1. In the present embodiment, since the aluminum component 10 is an extruded member, it is difficult to have variation in the shape of the rib 14c in the extrusion direction, and thus the rib 14c extends along the total length. The rib 14c protrudes from both surfaces of the top wall 14, in other words, protrudes inward and outward of the aluminum component 10 from both of the upper and lower surfaces of the top wall 14. The rib 11a protrudes inward of the aluminum component 10 from the upper surface of the bottom wall 11. In the aluminum component 10, the top wall 14, the sidewalls 12 and 13, and the bottom wall 11 define a space 18 including openings 16 and 17 at both ends.

The steel pipe 20 is a hollow rectangular pipe made of steel, extending upward and downward, and including openings at both ends. No openings are provided with peripheral walls 21 to 24 of the steel pipe 20. In plan view, the steel pipe 20 has an outer shape similar to the shape of the insertion hole 14a and slightly smaller than the insertion hole 14a so that the steel pipe 20 can be inserted into the insertion hole 14a of the aluminum component 10.

Figure 2:
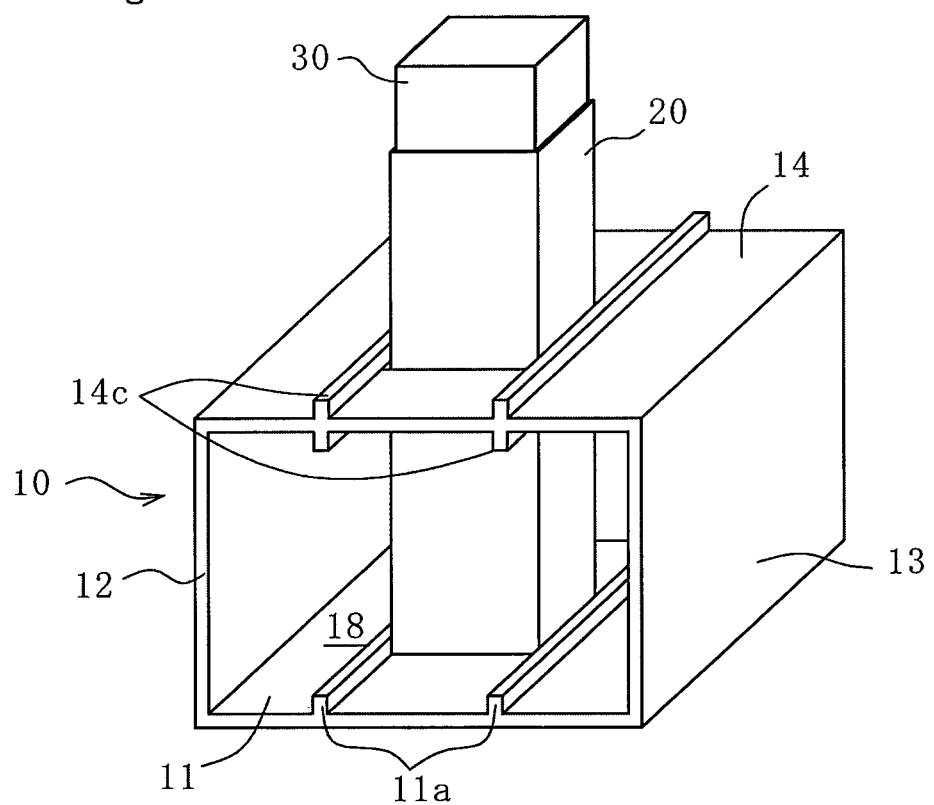
FIG. 2 is a perspective view of a state in which the first and second members illustrated in FIG. 1 are combined before press-fit joining.

As illustrated in FIG. 2, before joining, the aluminum component 10 and the steel pipe 20 are combined and disposed at a press device (not illustrated) or the like while an elastic member 30 is inserted into the steel pipe 20. Specifically, the elastic member 30 is inserted into the steel pipe 20, the steel pipe 20 into which the elastic member 30 is inserted is inserted into the insertion hole 14a of the aluminum component 10, and the steel pipe 20 is placed onto the bottom wall 11 in the space 18, which completes the combination before press-fit joining. In this combination completed state, one end (in FIG. 2, the lower end) of the steel pipe 20 is positioned between the ribs 11a in the aluminum member 10, but the other end (in FIG. 2, the upper end) of the steel pipe 20 is positioned out of the aluminum member 10.

The elastic member 30 is a rectangular column made of rubber material, having a dimension determined so that the elastic member 30 can be inserted in the steel pipe 20, and extending upward and downward. Similarly to the steel pipe 20, the elastic member 30 is placed on the bottom wall 11 of the aluminum component 10, and has a length longer than that of the steel pipe 20 in the vertical direction. Thus, when inserted in the steel pipe 20, the elastic member 30 protrudes out of the upper end of the steel pipe 20.

Figure 3:
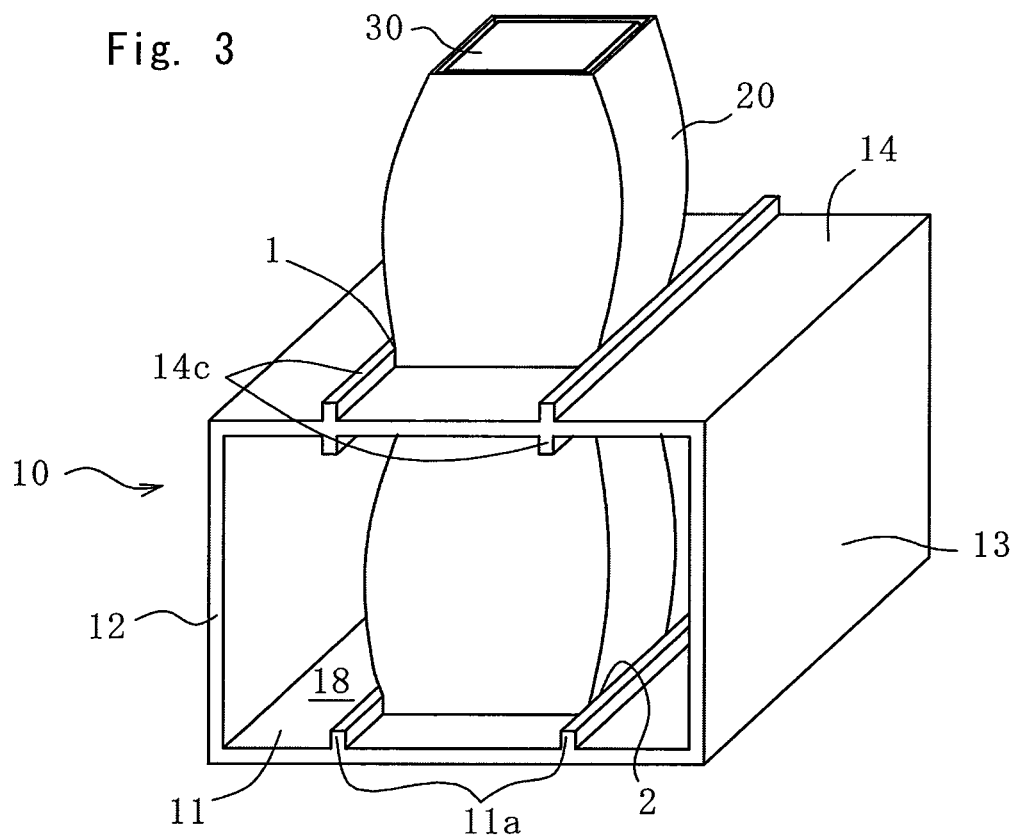
FIG. 3 is a perspective view of the first and second members illustrated in FIG. 2 after press-fit joining.

As illustrated in FIG. 3, when the elastic member 30 in the state illustrated in FIG. 2 is pressed downward by the press device (not illustrated) or the like, the dimension of the elastic member 30 decreases in the vertical direction but increases in the horizontal direction. Thus, the steel pipe 20 is expanded and deformed in the horizontal direction in accordance with this elastic deformation (expansion) of the elastic member 30. In this manner, the steel pipe 20 is enlarged and deformed to be joined to the aluminum component 10 by press-fitting.

Figure 4:
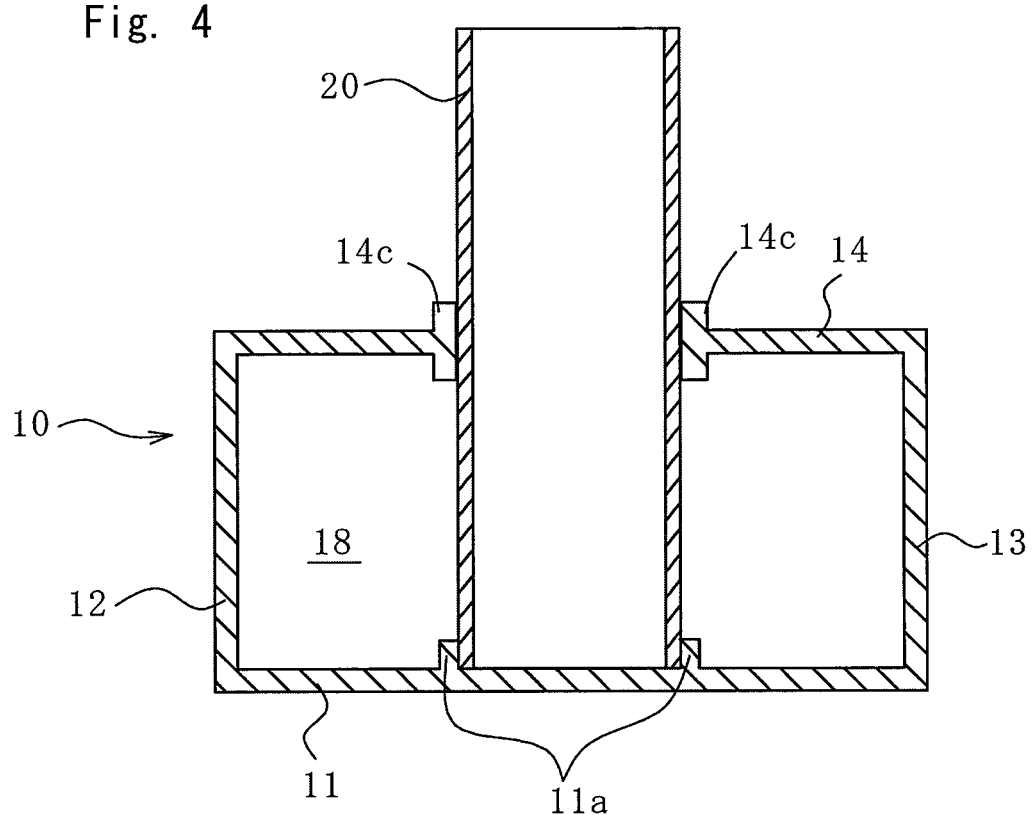
FIG. 4 is a longitudinal sectional view of FIG. 2.
Figure 5:
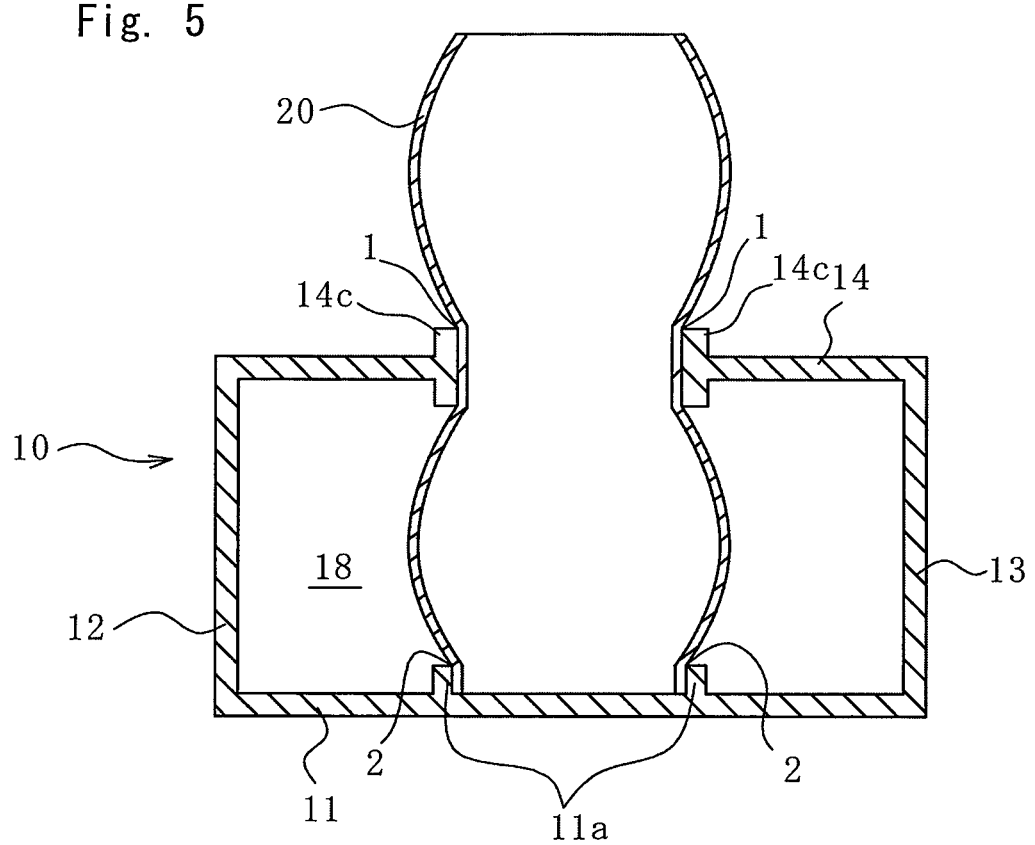
FIG. 5 is a longitudinal sectional view of FIG. 3.

As illustrated in FIGS. 4 and 5, when joined to the aluminum component 10 by press-fitting, the steel pipe 20 bulges at places other than joining parts 1 and 2 to the aluminum component 10.

In this manner, since each rib 14c is provided at the edge part 14b of the insertion hole 14a, the aluminum component 10 and the steel pipe 20 are joined together effectively in planar contact, not in line contact nor edge contact, and thus have an increased contact area at the joining part 1, thereby achieving increased joining strength. In addition, the steel pipe 20 can have an increased curvature at the joining part 1, which prevents cracking of the steel pipe 20. The present method can increase the joining strength without subjecting the molded aluminum component 10 to post fabrication such as burring and prevent cracking of the steel pipe 20, thereby reducing increase in man-hour and manufacturing cost.

Since the aluminum component 10 is an extruded hollow rectangular pipe, the ribs can be provided simultaneously with molding of the aluminum component 10, thereby reducing man-hour increase due to formation of the ribs. However, since the extrusion molding is employed, the direction in which the rib 14c extends is limited to the extrusion direction. In the present method, the method of enlarging the steel pipe 20 through deformation is not limited to electromagnetic molding. The shape of the aluminum component 10 is not particularly limited, but the press-fit joining is also applicable to the aluminum component 10 having the shape of a rectangular pipe as in the present embodiment.

Figure 6:
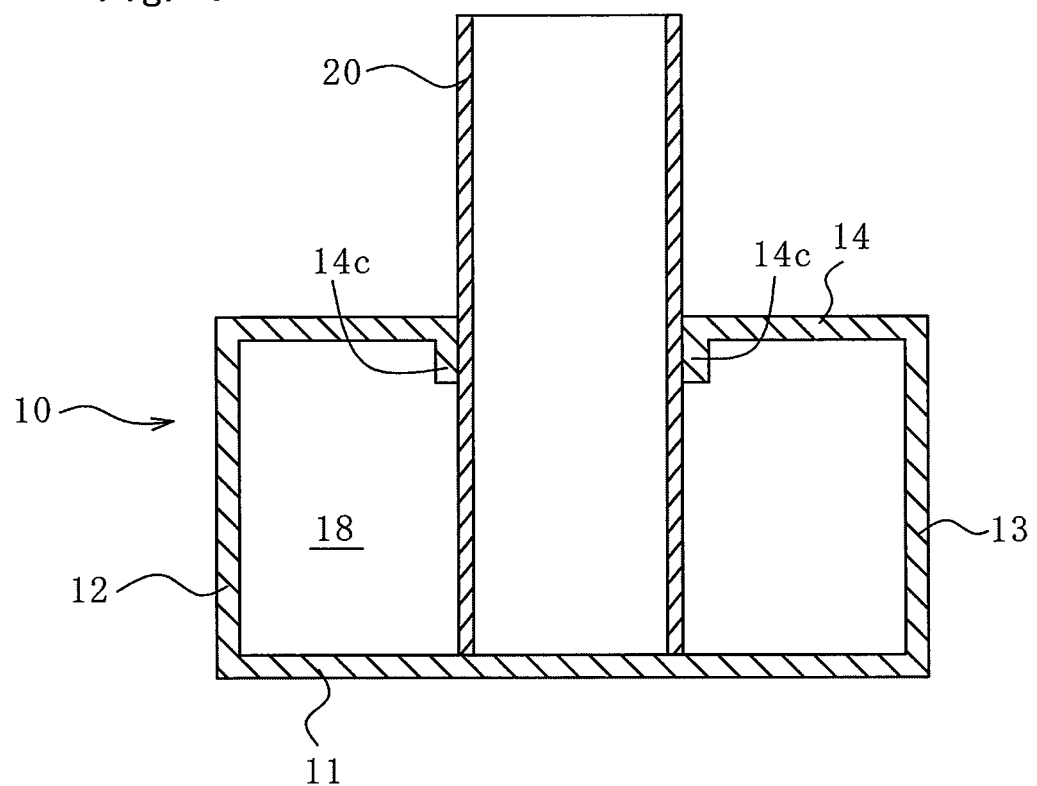
FIG. 6 is a longitudinal sectional view illustrating a modification of FIG. 4.
Figure 7:
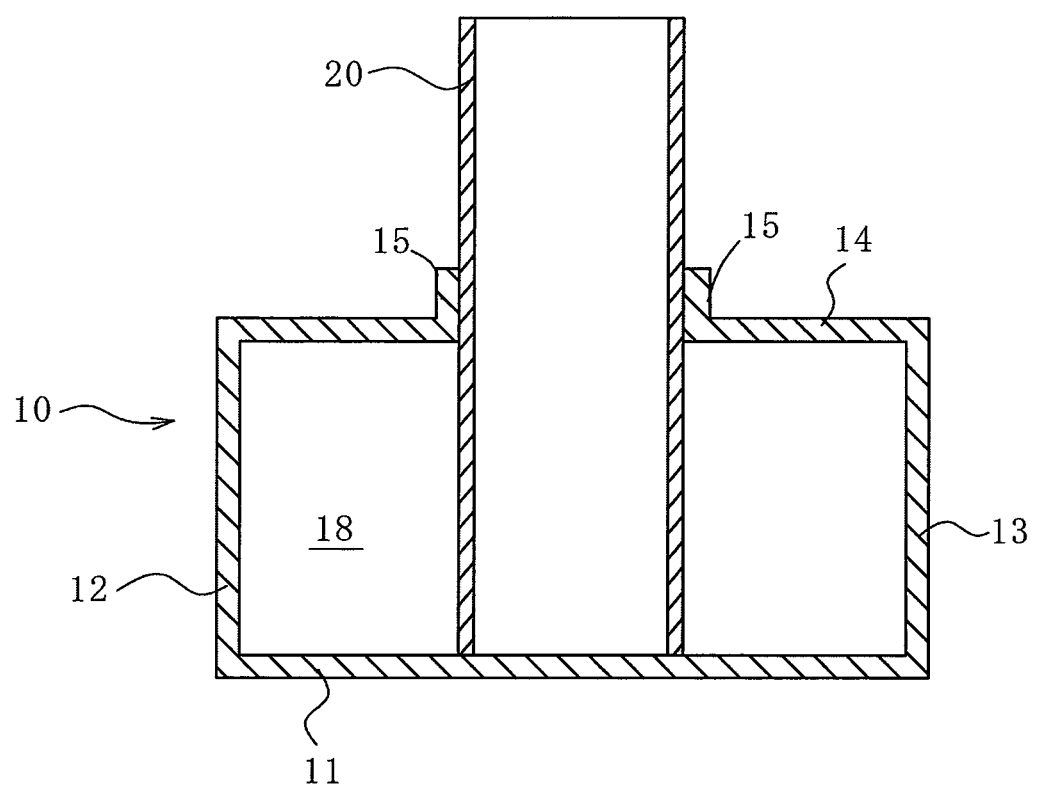
FIG. 7 is a longitudinal sectional view illustrating another modification of FIG. 4.

As two modifications of the present embodiment illustrated in FIGS. 6 and 7, the rib 14c of the aluminum component 10 may protrude only from one surface instead of protruding from both surfaces of the top wall 14. In FIG. 6, the rib 14c protrudes only from the lower surface of the top wall 14, in other words, protrudes inward of the aluminum component 10. In FIG. 7, the rib 14c protrudes only from the upper surface of the top wall 14, in other words, protrudes outward of the aluminum component 10. Like these modifications, the bottom wall 11 does not necessarily need to be provided with the rib 11a (refer to FIG. 4), but may have a flat inner surface.

When FIGS. 4, 6, and 7 are compared, it is most preferable that the rib 14c protrudes from both surfaces of the top wall 14 as illustrated in FIG. 4. When the rib 14c protrudes from both surfaces of the top wall 14, a load is equally applied on the aluminum component 10 at joining, which leads to a reduced risk of damage and breaking. With the same length in the configurations illustrated in FIGS. 4, 6, and 7, the rib 14c has a smaller amount of protrusion in the configuration in which the rib 14c protrudes from both surfaces of the top wall 14 as illustrated in FIG. 4, and thus deforms in a smaller amount when a load is added.

Figure 8:
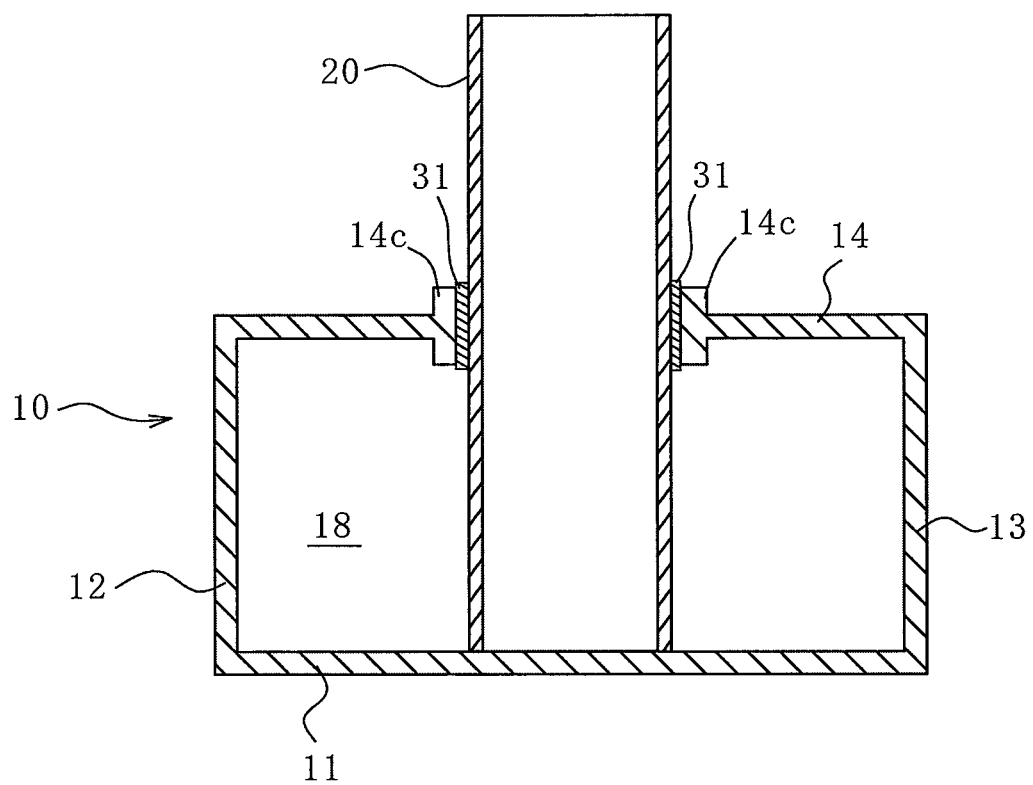
FIG. 8 is a longitudinal sectional view illustrating another modification of FIG. 4.

Like a modification of the present embodiment, which is illustrated in FIG. 8, adhesive agent 31 may be disposed between the aluminum component 10 and the steel pipe 20. When the insulating adhesive agent (insulation member) 31 is disposed between the aluminum component 10 and the steel pipe 20, electric corrosion can be prevented from occurring between the aluminum component 10 and the steel pipe 20. In particular, in the present method, the rib 14c is provided at the joining part 1 to have an increased contact area, and thus the aluminum component 10 and the steel pipe 20 contact with each other in planar contact, not in side contact. Thus, the configuration with the planar contact allows the adhesive agent 31 to be easily disposed as compared to a configuration with side contact, thereby more easily preventing electric corrosion between dissimilar metals. The adhesive agent 31 only needs to be insulative, and does not necessarily need to be adhesive. Alternatively, for example, foaming agent is applicable.

Figure 9:
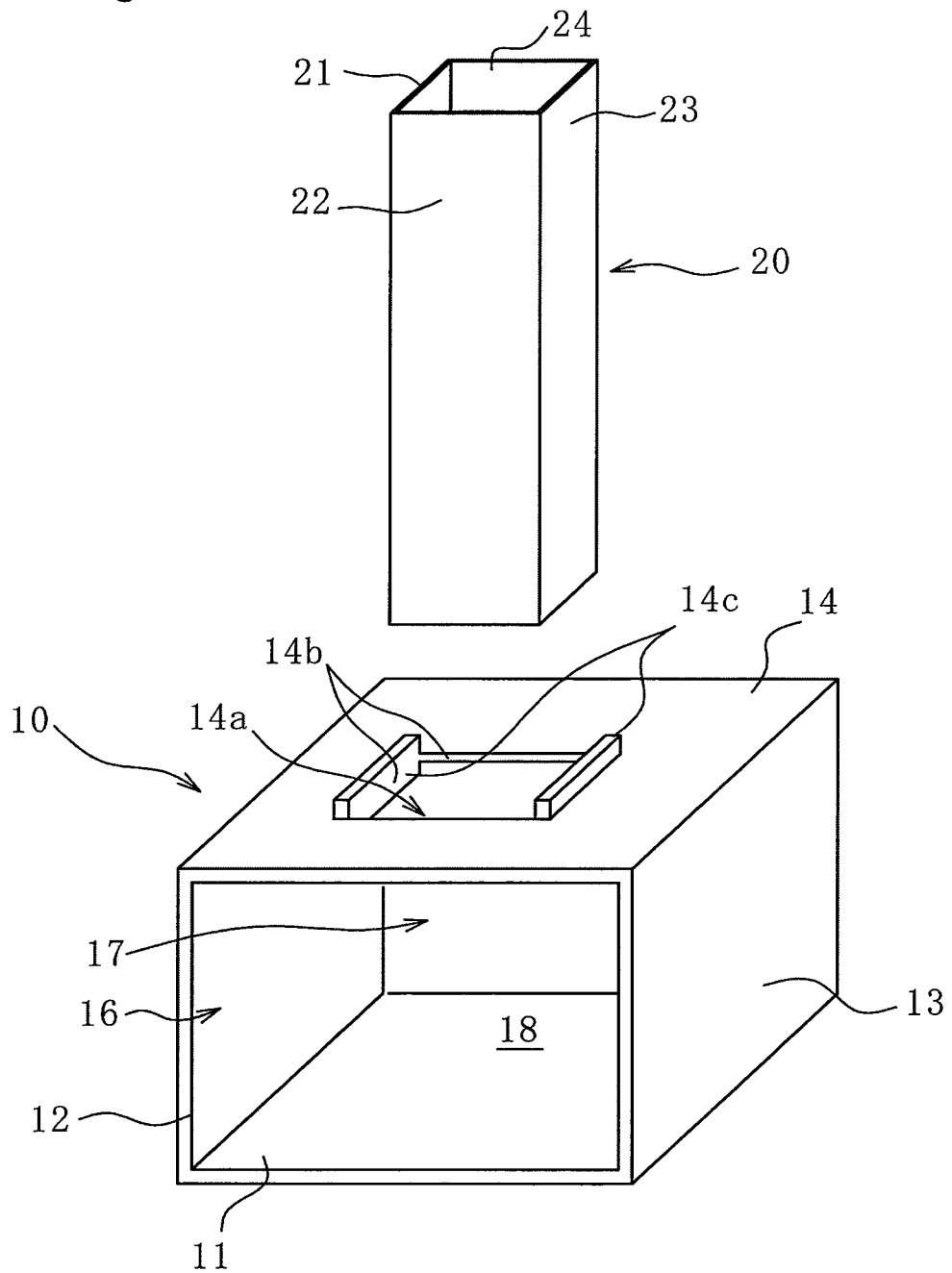
FIG. 9 is a perspective view of the first and second members before press-fit joining, illustrating a modification of FIG. 1.

Like a modification of the present embodiment, which is illustrated in FIG. 9, the rib 14c of the aluminum component 10 may be provided only at the edge part 14b of the insertion hole 14a and cut off at any part other than the edge part 14b. As described above, in the present embodiment, since the aluminum component 10 is an extruded member, the rib 14c may be provided only at the edge part 14b of the insertion hole 14a by temporarily forming the rib 14c along the total length of the aluminum component 10 simultaneously with molding of the aluminum component 10, and then cutting off any part of the rib 14c other than the edge part 14b through fabrication after the molding of the aluminum component 10.

When the aluminum component 10 is an extruded hollow rectangular pipe, the rib 14c is basically provided along the total length of the extrusion direction. However, the rib 14c in contact with the steel pipe 20 at the edge part 14b of the insertion hole 14a is effective for increasing the joining strength, and thus the rib 14c at the other part is cut off to reduce the weight of the aluminum component 10.

Figure 10:
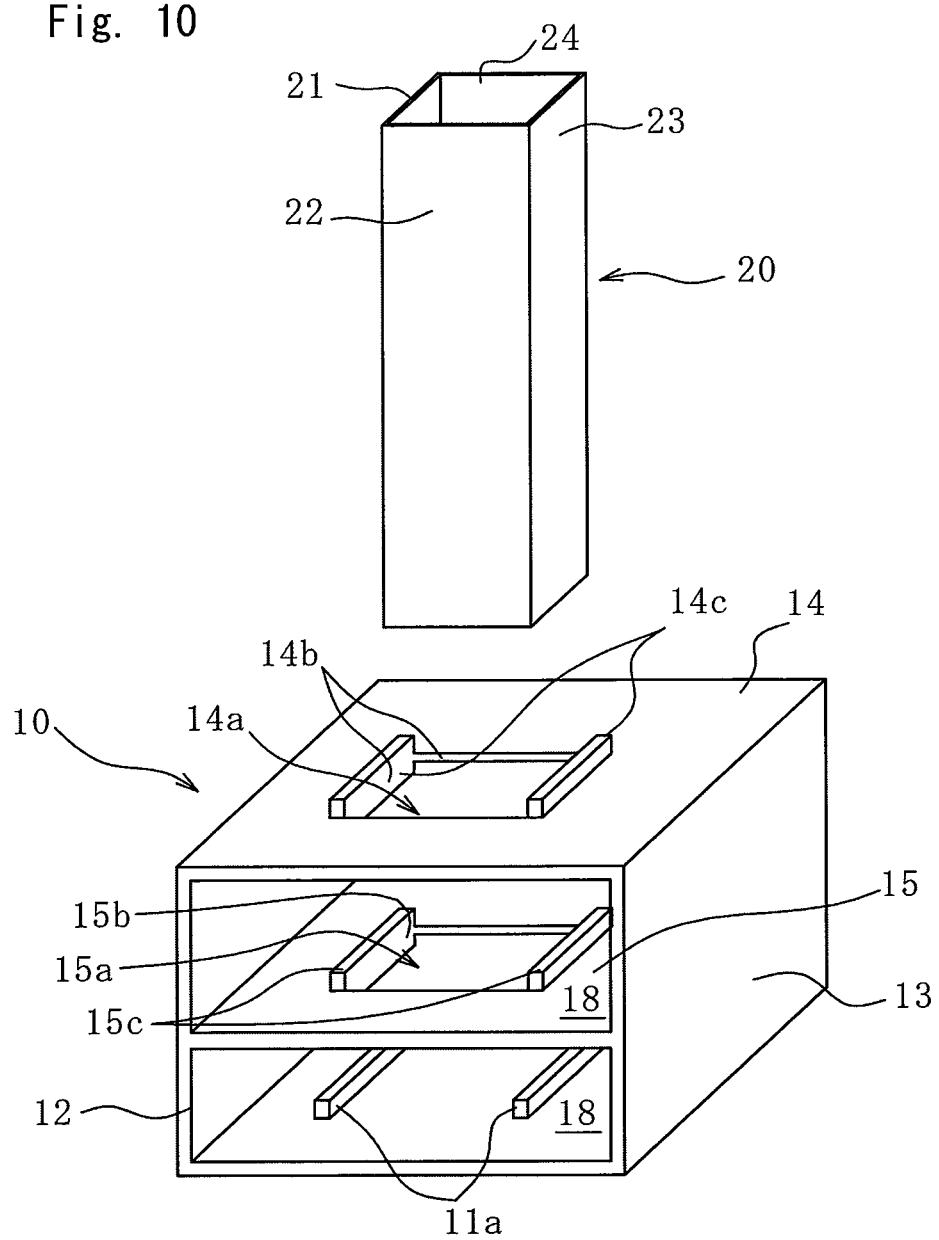
FIG. 10 is a perspective view of the first and second members before press-fit joining, illustrating another modification of FIG. 1.
Figure 11:
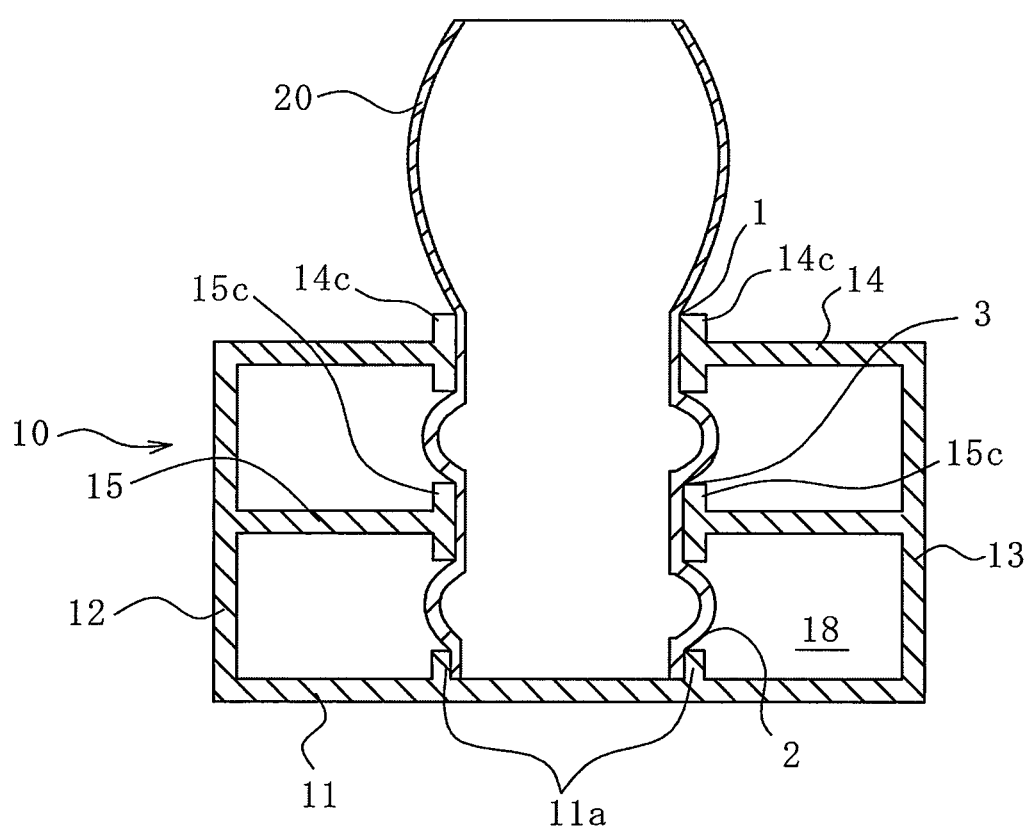
FIG. 11 is a longitudinal sectional view of the first and second members illustrated in FIG. 10 after press-fit joining.

The aluminum component 10 may have various different shapes. For example, as illustrated in FIGS. 10 and 11, a partition wall 15 may be provided between the bottom wall 11 and the top wall 14 in parallel thereto. The partition wall 15 includes an insertion hole 15a having shape and size same as those of the insertion hole 14a at a position overlapping with the insertion hole 14a in plan view. A rib 15c is provided at part of an edge part 15b of the insertion hole 15a. The rib 15c is provided at a position overlapping with each of the ribs 14c and 11a in plan view. In this case, the aluminum component 10 and the steel pipe 20 are joined together at three joining parts 1, 2, and 3.

Second Embodiment

Figure 12:
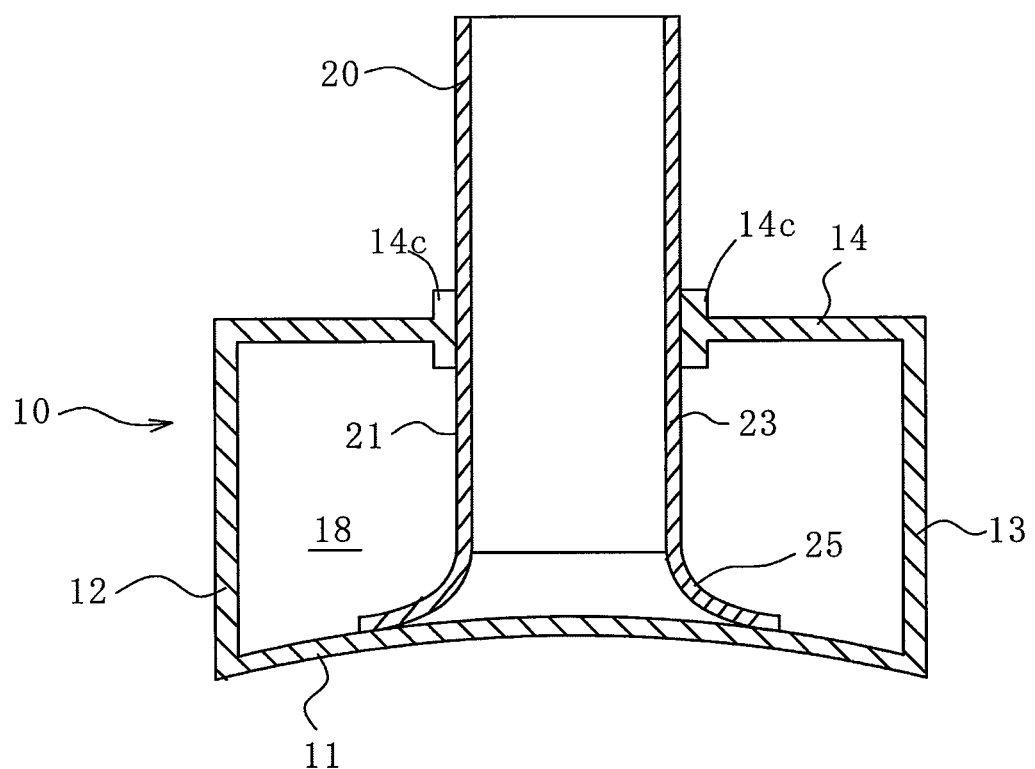
FIG. 12 is a longitudinal sectional view of the first member and second members according to a second embodiment of the present invention after press-fit joining.

In a joining method according to the present embodiment illustrated in FIG. 12, any component other than lower parts of the aluminum component 10 and the steel pipe 20 has a configuration same as that of the first embodiment illustrated in FIGS. 1 to 5. Thus, any part same as that of the configuration illustrated in FIGS. 1 to 5 is denoted by the same reference sign, and description thereof will be omitted.

In the aluminum component 10 according to the present embodiment, the bottom wall 11 is curved inward.

In the steel pipe 20 according to the present embodiment, the peripheral walls 21 and 23 among the peripheral walls 21 to 24 extend more downward than the peripheral walls 22 and 24.

When the steel pipe 20 is inserted into the insertion hole 14a of the aluminum component 10, lower end parts 25 of the steel pipe 20 are pressed against the upper surface of the curved bottom wall 11 of the aluminum component 10 and bent. In other words, the lower end parts 25 of the peripheral walls of the steel pipe 20 are bent outward.

Since the lower end parts 25 of the steel pipe 20 are bent outward, the bent lower end part 25 functions as a removal prevention member to prevent the steel pipe 20 from coming off the aluminum component 10 when the press-fit joining is broken.

Figure 13:
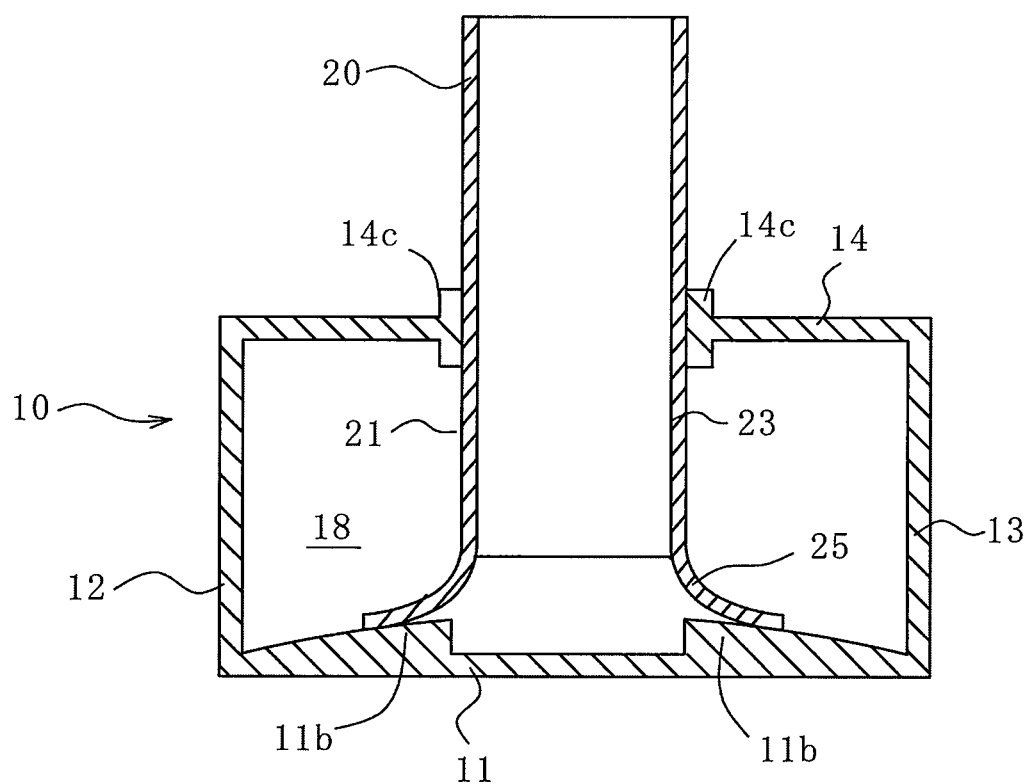
FIG. 13 is a longitudinal sectional view illustrating a modification of FIG. 12.

Like a modification of the present embodiment illustrated in FIG. 13, the aluminum component 10 may include a curved part 11b so that the lower end parts 25 of the steel pipe 20 are bent by pressing the steel pipe 20 against the aluminum component 10. When the aluminum component 10 includes the curved part 11b separately from the bottom wall 11, the bottom wall 11 of the aluminum component 10 does not need to be curved.

Third Embodiment

Figure 14:
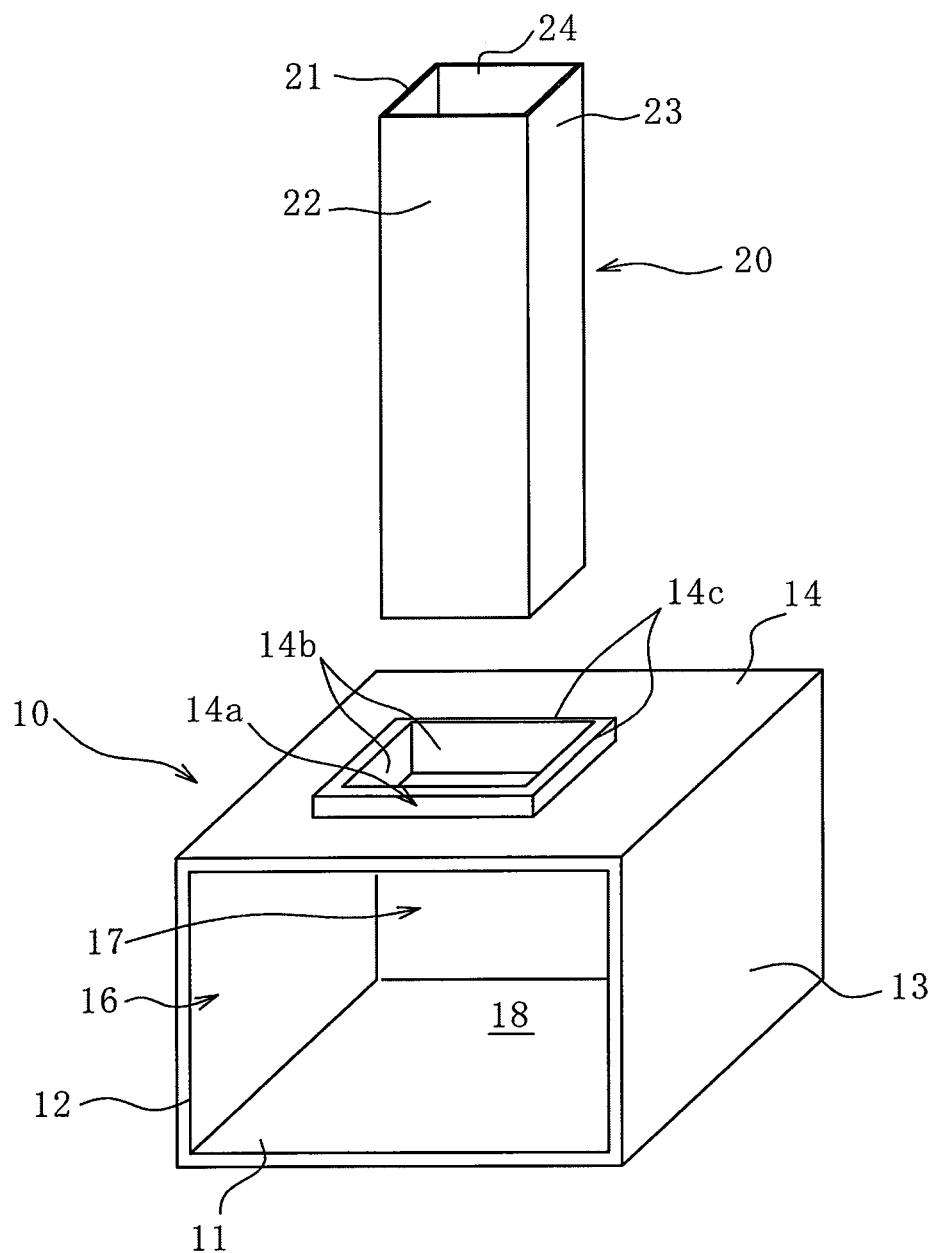
FIG. 14 is a perspective view of the first and second members according to a third embodiment of the present invention before press-fit joining.

In a joining method according to the present embodiment illustrated in FIG. 14, any component other than the aluminum component 10 has a configuration same as that of the first embodiment illustrated in FIGS. 1 to 5. Thus, any part same as that of the configuration illustrated in FIGS. 1 to 5 is denoted by the same reference sign, and description thereof will be omitted.

The aluminum component 10 according to the present embodiment is made of aluminum die-cast (ADC). Thus, the direction in which the rib 14c extends can be freely set, and in the present embodiment, the rib 14c is provided at the entire circumference of the edge part 14b of the insertion hole 14a.

Since the aluminum component 10 is made of die-cast material, the rib 14c can be provided at the entire circumference of the edge part 14b of the aluminum component 10 at molding. Thus, the joining area can be increased as compared to when the aluminum component 10 is an extruded member in which the rib 14c extends only in the extrusion direction (first and second embodiments), thereby further increasing the joining strength.

The above describes specific embodiments of the present invention and modifications thereof, but the present invention is not limited to the above-described embodiments and modifications. Various changes are applicable within the scope of the present invention. For example, the contents of the individual embodiments may be combined as an embodiment of the present invention as appropriate.

The invention claimed is:

1. A joining method for members, comprising:
   providing a first member as well as a second member having a hollow shape, the first member including a first wall part and a second wall part facing the first wall part to form a space between the first wall part and the second wall part, the first wall part having an insertion hole, and a rib provided in at least part of an edge part of the insertion hole;
   inserting the second member through the insertion hole of the first member until a leading end of the second member contact with the second wall part of the first member; and
   expanding and deforming the second member to join the second member to the first member by press-fitting.

2. The joining method for members according to claim 1, wherein
   the first member is an extruded hollow rectangular pipe, and
   the rib extends in a longitudinal direction of the first member.

3. The joining method for members according to claim 2, wherein the rib of the first member is provided only at the edge part of the insertion hole.

4. The joining method for members according to claim 1, wherein the first member is made of aluminum die-cast material, and the rib is provided at an entire circumference of the edge part.

5. The joining method for members according to claim 1, wherein the first wall part has a one surface and a second surface opposite side of the one surface, and the rib protrudes from both surfaces of the first wall part.

6. The joining method for members according to claim 1, further comprising bending outward at least part of an end part of the second member.

7. The joining method according to claim 6, wherein
   the first member includes a second wall part facing the first wall part,
   the second wall part protrudes toward the first walls part, and
   at least part of the end part of the second member is bent outward by pressing the end part of the second member against the second wall part.

8. The joining method for members according to claim 1, further comprising disposing an insulation member between the first member and the second member.

9. The joining method for members according to claim 2, wherein the first wall part has a one surface and a second surface opposite side of the one surface, and the rib protrudes from both surfaces of the first wall part.

10. The joining method for members according to claim 3, wherein the first wall part has a one surface and a second surface opposite side of the one surface, and the rib protrudes from both surfaces of the first wall part.

11. The joining method for members according to claim 4, wherein the first wall part has a one surface and a second surface opposite side of the one surface, and the rib protrudes from both surfaces of the first wall part.

12. The joining method for members according to claim 2, further comprising bending outward at least part of an end part of the second member.

13. The joining method for members according to claim 3, further comprising bending outward at least part of an end part of the second member.

14. The joining method for members according to claim 4, further comprising bending outward at least part of an end part of the second member.

15. The joining method according to claim 12, wherein the first member includes a second wall part facing the first wall part, the second wall part protrudes toward the first walls part, and at least part of the end part of the second member is bent outward by pressing the end part of the second member against the second wall part.

16. The joining method according to claim 13, wherein the first member includes a second wall part facing the first wall part, the second wall part protrudes toward the first walls part, and at least part of the end part of the second member is bent outward by pressing the end part of the second member against the second wall part.

17. The joining method according to claim 14, wherein the first member includes a second wall part facing the first wall part, wherein the second wall part protrudes toward the first walls part, and wherein at least part of the end part of the second member is bent outward by pressing the end part of the second member against the second wall part.

18. The joining method for members according to claim 2, further comprising disposing an insulation member between the first member and the second member.

19. The joining method for members according to claim 3, further comprising disposing an insulation member between the first member and the second member.

20. The joining method for members according to claim 4, further comprising disposing an insulation member between the first member and the second member.

21. A joining method for members, comprising:

providing a first member as well as a second member having a hollow shape, the first member including a first wall part in which an insertion hole is formed, and a rib provided in at least part of an edge part of the insertion hole;

inserting the second member into the insertion hole of the first member; and expanding and deforming the second member to join the second member to the first member by press-fitting, wherein the first member is an extruded hollow rectangular pipe, and the rib extends in a longitudinal direction of the first member.

22. A joining method for members, comprising:

providing a first member as well as a second member having a hollow shape, the first member including a first wall part in which an insertion hole is formed, and a rib provided in at least part of an edge part of the insertion hole;

inserting the second member into the insertion hole of the first member;

expanding and deforming the second member to join the second member to the first member by press-fitting; and disposing an insulation member between the first member and the second member.

* * * * *